(No Model.)

C. MURRAY.
HEAT INDICATOR AND REGULATOR FOR STOVE OVENS.

No. 267,651. Patented Nov. 14, 1882.

Witnesses:
Jas. E. Hutchinson
Henry C. Hazard

Inventor
Chas Murray, by
Geo. S. Prindle, his Atty.

UNITED STATES PATENT OFFICE.

CHARLES MURRAY, OF SPRINGFIELD, ILLINOIS.

HEAT INDICATOR AND REGULATOR FOR STOVE-OVENS.

SPECIFICATION forming part of Letters Patent No. 267,651, dated November 14, 1882.

Application filed May 18, 1882. (No model.)

*To all whom it may concern:*

Be it known that I, CHARLES MURRAY, of Springfield, in the county of Sangamon, and in the State of Illinois, have invented certain new and useful Improvements in Automatic Heat Indicators and Regulators for Stove-Ovens; and I do hereby declare that the following is a full, clear, and exact description thereof, reference being had to the accompanying drawings, making a part of this specification, in which—

Figure 1:
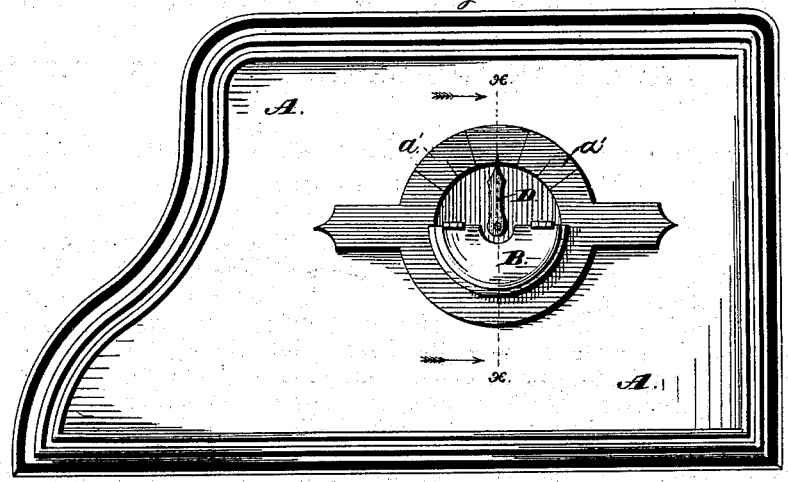
Figure 2:
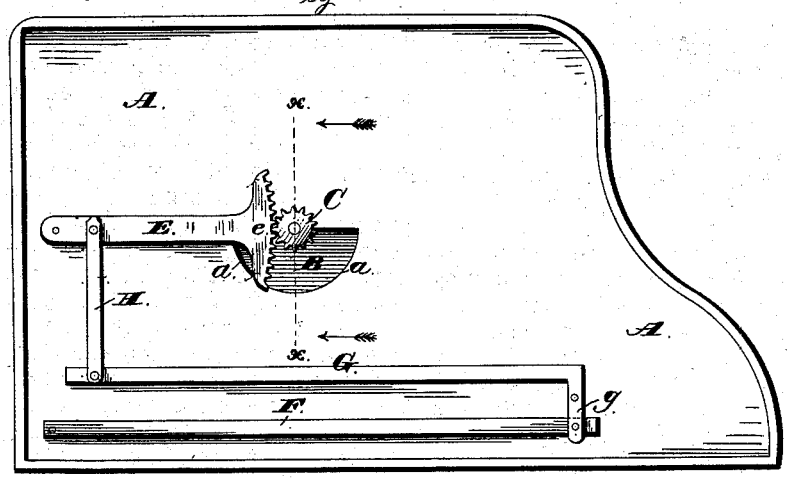
Figures 3, 4:
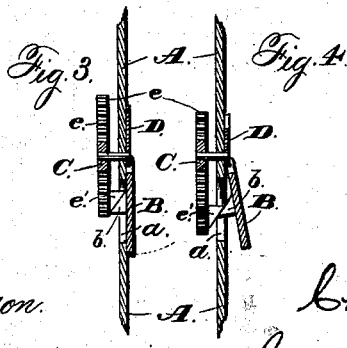

Figure 1 is an elevation of the outer side of an oven-door containing my improvement. Fig. 2 is a like view of the inner side of the same; and Figs. 3 and 4 are sections of said door upon line $x$ $x$ of Figs. 1 and 2, and show respectively the ventilating or heat-regulating damper opened and closed.

Letters of like name and kind refer to like parts in each of the figures.

The design of my invention is to enable a stove-oven to be heated to and maintained at the required temperature for baking purposes, and to show the temperature by a suitable indicator; to which end it consists in the construction and combination of parts whereby the desired result is obtained, substantially as and for the purpose hereinafter specified.

In the annexed drawings, A represents the door of a stove-oven, within which, at or near its center, is provided an opening, $a$, which opening may have any desired form, but is preferably in the form of a half-circle, and is provided with a door, B, that is hinged at its straight edge to or upon the corresponding edge of said opening, and is capable of being moved so as to close over or to leave unobstructed the same.

Journaled at the axis of the opening $a$ is a spindle, upon the inner end of which is secured a pinion, C, and upon its outer end a pointer or hand, D, the latter of which moves over a graduated circular dial, $a'$, that is formed upon or secured to the outer face of the door A. The pinion C is engaged by a curved toothed rack, $e$, which is formed upon one end of a horizontal bar, E, that is pivoted at its opposite end upon the door A, the arrangement being such as to cause said pinion to be rotated by the rising or falling of the engaging end of said bar, which motion is produced by the following-described means:

Near the lower edge of the door A is placed horizontally a bar of zinc or other like metal, F, that is easily expansible under heat, one end of which bar is rigidly secured to said door, while its opposite end is pivoted upon one end of a short arm, $g$, that depends vertically from a lever, G, which is arranged horizontally above said bar F, and is pivoted midway between the ends of said arm $g$ to or upon said door A. The free end of the lever G, opposite to its pivotal bearing, is connected with the bar E at a point in front of the pivotal bearing of the latter by means of a bar, H, which extends vertically between and has its ends pivoted upon said parts. The longitudinal change of dimensions of the bar F under the influence of heat moves the arm $g$ horizontally, and causes the free end of the lever G to move vertically, which motion is, by means of the bar H, communicated to the bar E, and thereby the pinion C is caused to rotate, and the degree of such rotation indicated by the pointer D upon the dial $a'$. By properly proportioning the said parts any desired movement of said pointer may be secured for a given change of temperature, and by ascertaining the position of the same at different degrees of temperature and marking such positions upon said dial the coincidence of said pointer with any one of said marks will indicate the corresponding degree of temperature within the oven, thus enabling an operative to know with certainty when the proper temperature exists for baking, roasting, &c.

In order that an excessive heat within the oven may be avoided, the door B is connected with the automatic mechanism described by the following means, viz: Upon the inner face of the door B is provided a lug, $b$, the rear face of which has an inclination downward and away from the oven-door A. A similar lug, $e'$, but having the reverse inclination of its face, is provided upon the outer face of the bar E, and is relatively located so that it comes into engagement with said lug $b$ when the toothed end of said bar E has moved downward below a certain point, and by such contact causes said door B to swing outward. The relative positions of the lugs $b$ and $e$ are such as to cause them to engage at the moment when the temperature within the oven has reached the desired point, after which any increase of such temperature will cause the door B to open, and, by permitting air to circulate through the opening $a$, lower the temperature of said oven. As the temperature rises and falls the door B will automatically open and close, so as to prevent extremes and keep the oven at the point of greatest efficiency.

In use of the mechanism described it will be necessary that means be provided for adjusting the relative positions of parts, as the bar F becomes permanently elongated by frequent expansion.

The mechanism described furnishes means whereby an oven may be placed in and maintained at a condition of greatest efficiency and the operation of baking reduced to a mathematical certainty, instead of, as heretofore, being dependent upon the judgment of the operative.

Having thus fully set forth the nature and merits of my invention, what I claim as new is—

1. In combination with the door A, provided with the opening $a$, the hinged damper B, having the inclined lug $b$, the pivoted bar E, the expansion-bar F, the lever G, having the arm $g$, and the connecting-bar H, substantially as and for the purpose specified.

2. In combination with the door A, provided with the opening $a$ and graduated dial $a'$, the hinged damper B, having the inclined lug $b$, the pinion C, the pointer D, the pivoted rack-bar E $e$, the expansion-bar F, the lever G $g$, and the connecting-bar H, substantially as and for the purpose shown.

In testimony that I claim the foregoing I have hereunto set my hand this 11th day of May, 1882.

CHARLES MURRAY.

Witnesses:
L. H. BRADLEY,
F. P. HUFF.